United States Patent Office 3,512,927
Patented May 19, 1970

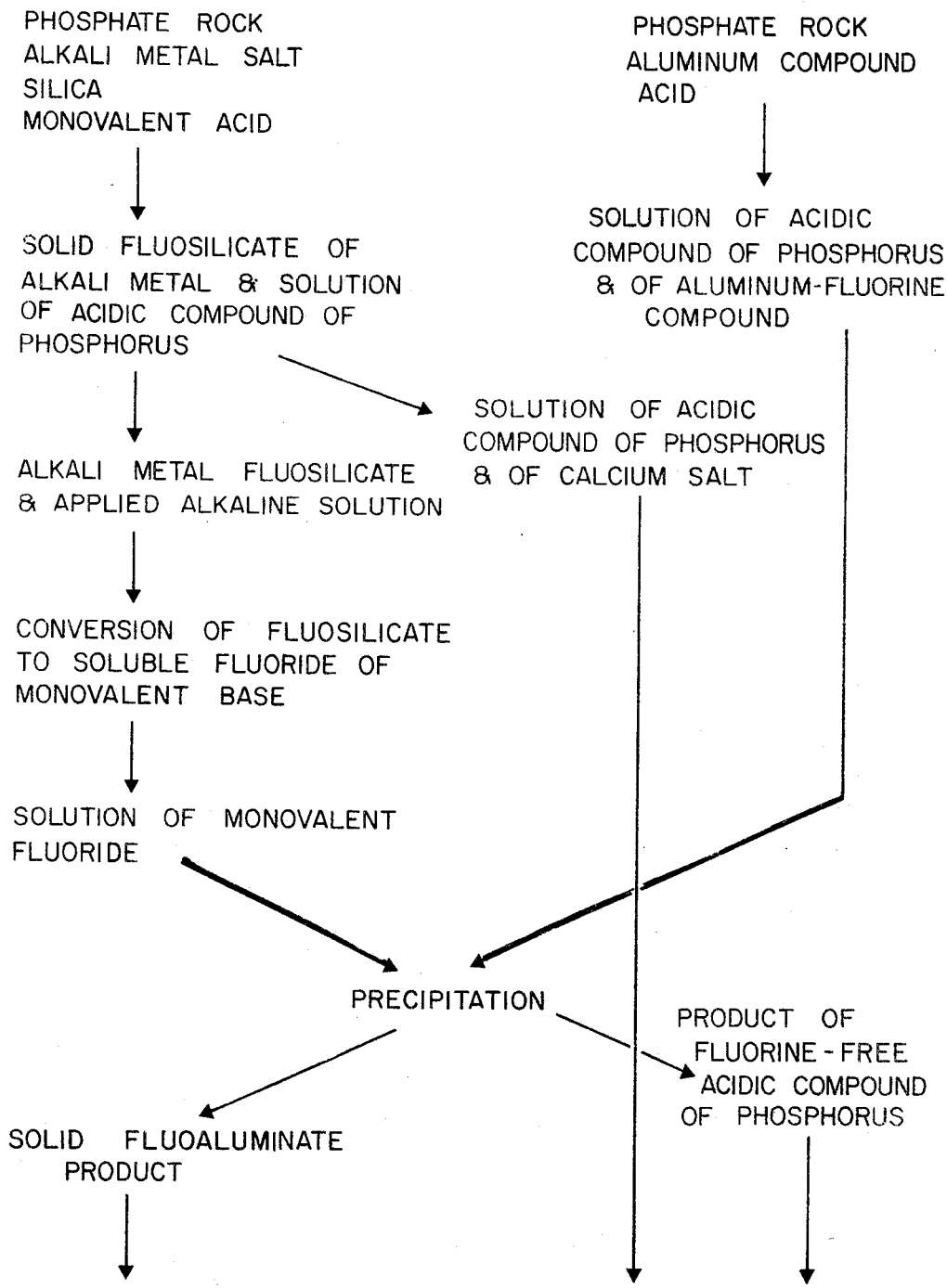

3,512,927
CHEMICALLY TREATING PHOSPHORITE AND OB-
TAINING SEPARATE PRODUCTS OF FLUORINE
AND OF PHOSPHORUS
Anson G. Betts, Plainfield, Mass.
(West Cummington, Mass. 01026)
Filed July 26, 1965, Ser. No. 475,009
Int. Cl. C01f 7/50; C01b 25/18; C05b 11/04
U.S. Cl. 23—88                                    14 Claims

ABSTRACT OF THE DISCLOSURE

The herein-described improvements comprise recovering part of the fluorine of acid-treated phosphate rock, etc. in combination with silicon in fluosilicate form and subsequently and separately converting the fluorine in fluosilicate form to fluorine in soluble fluoride form, and recovering another part of the fluorine of the acid-treated rock in the form of a soluble compound of aluminum and fluorine. The two forms are then united in a solution containing sodium, potassium or ammonium, which results in precipitation of aluminum and fluorine in the form of a precipitated fluoaluminate recovered as a separate product. By recovering the fluorine of the acid-treated phosphate rock in a separate product, the quality of the phosphate product is benefited in purity and quality.

This invention relates to chemically treating phosphorite and obtaining a separate product of fluorine and a product of phosphorus.

SUMMARY

Fluoriferous phosphate rock is treated with acid in a manner to obtain two intermediate products, one of which consists of solution of fluoride of a base of the group which consists of sodium, potassium and ammonium and the other of which consists of solution of an acidic compound of phosphorus containing an aluminum-fluorine compound and may also contain calcium salt of an acid of treatment of the phosphate rock. The two solutions are united with the result that the fluorine of the used phosphate rock is separately obtained in a solid precipitated fluoaluminate product and the phosphorus of the rock is separately obtained in a product consisting of defluorinated solution of an acidic compound of phosphorus which may contain calcium salt of an acid of treatment of the phosphate rock.

Heretofore in the chemical processing of phosphate rock and the like, the object principally sought has been the conversion and recovery of the phosphorus constituent in commercially usable products of phosphorus, generally regarding the fluorine constituent of the rock as an impediment in processing, and a nuisance to be escaped and avoided with minimum inconvenience and expense, notwithstanding loss of large quantities of unseparated fluorine left as a diluent and value-reducer in phosphate products of great importance.

The intrinsic values of the phosphorus constituent and of the fluorine constituent in the common phosphate rocks are not widely different, for the reason that the lower proportion of fluorine is offset by its higher intrinsic value.

As a matter of conservation and use of natural resources, and economics in conversion to useful products, there has existed a need of improved means of treatment of phosphate rocks and the like for more thorough separate recovery, in an economical and convenient manner, of the fluorine of the rocks in well-saleable products, coupled with a need to improve the quality of important and widely-necessary products of phosphorus, by elimination of fluorine.

In the practice of the invention, wherein phosphate rock and the like is treated with and decomposed by application of strong acid, at least a substantial proportion of the rock is treated with acid in presence of a relatively reactive well-dispersed form of silicious matter, with the result that a substantial part of the fluorine of the treated rock is first converted to fluosilicate of an easily available simple and cheap monovalent base, such bases being hydrogen, sodium and potassium.

In a subsequent step the so-produced fluosilicate is treated with and decomposed by an applied alkaline compound of a common monovalent base of the group of bases which consists of ammonium, sodium and potassium, thereby converting fluorine of the treated fluosilicate to fluoride of the base, as illustrated by, for example

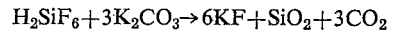
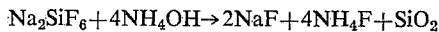
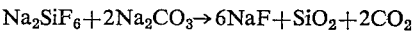
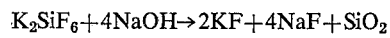

$H_2SiF_6 + 6NH_4OH \rightarrow 6NH_4F + SiO_2$ $H_2SiF_6 + 3K_2CO_3 \rightarrow 6KF + SiO_2 + 3CO_2$ $Na_2SiF_6 + 4NH_4OH \rightarrow 2NaF + 4NH_4F + SiO_2$ $Na_2SiF_6 + 2Na_2CO_3 \rightarrow 6NaF + SiO_2 + 2CO_2$ $K_2SiF_6 + 4NaOH \rightarrow 2KF + 4NaF + SiO_2$ The fluoride of monovalent base so obtained is produced in solution and such fluoride solution, hereinafter referred to as a $b$ solution, is utilized in the below-described manner and for the below-described result:

At least a portion of the utilized phosphate rock is treated with and decomposed by solution of a strong acid in presence of a compound of aluminum, in a manner and with use of proportions of materials, to respectively convert calcium of the treated rock into a solute contained in the resulting solution. The resulting solution also contains fluorine of the treated rock and aluminum of said compound, both of said fluorine and aluminum presumably present as dissolved aluminum-fluorine compound. Such produced solution is hereinafter referred to as an $a$ solution.

In the practice of the invention $a$ and $b$ solutions are subsequently united, with provision in the united solution, of a compound of a base of the group composed of sodium, potassium and ammonium, causing precipitation from the united solution of aluminum and fluorine combined in fluoaluminate of the said base, separated as a solid product from thereby purified solution containing a compound of phosphorus as another product.

In the practice it is not necessary that solutions $a$ and $b$ so united and utilized are derived from the treatment of the same portion of phosphate rock, nor is it necessary that so united $a$ and $b$ solutions are obtained by treatment of portions of phosphate rock with the same acid. For example a $b$ solution may result and be obtained from treatment of a portion of phosphate rock with solution of a common strong monovalent acid first resulting in formation of solid fluosilicate of a common alkali metal, from which solid a fluoride $b$ solution is subsequently derived as herein shown, and an $a$ solution may be derived from treatment of another portion of phosphate rock with solution of sulphuric acid, as shown for example in Example 3.

In a mode of operation of the invention both the $a$ solution and the $b$ solution may be obtained from the treatment of a single portion of phosphate rock with the same acid solution in a single treatment of the rock, wherein part of the fluorine of the rock enters the resulting solution as dissolved aluminum subfluoride and another part of the fluorine of the rock is converted to solid alkali metal fluosilicate contained in the solid residues separated from the resulting solution. The fluosilicate is then separately decomposed to produce a *b* solution containing a soluble fluoride of a monovalent base.

Hitherto, in production of superphosphates, phosphoric acid etc. and products derived from the phosphoric acid etc., by means of processes wherein phosphate rock is treated with and decomposed by strong acid solution, higher grade and more expensive phosphate rock concentrates have generally been selected.

This invention enables the economical and practical use in such treatment and conversion of more abundant and less expensive grades of phosphate rock containing a substantially greater proportion of silicious and clayey constituents, because of a novel utilization of a previously undesirable constituent and by means of a novel recovery of aluminum of the rock in a valuable fluoaluminate product.

An object is more economical production from phosphate rocks and the like of separate products of phosphorus and fluorine, each product substantially free of the other said element, and both of the products recovered in good percentage yield and in a convenient and economical manner.

An object is to make practical and economic use of more abundant grades of phosphate rocks than hitherto economically acceptable.

In the treatment of phosphate rock and the like with a common strong acid, first converting a substantial portion of the fluorine of the treated rock into fluosilicate form and then converting the fluorine of the fluosilicate into a more valuable form as constituent of a fluoaluminate product, it is an object to obtain multiplied benefits by (1) conversion of the fluorine of the obtained fluosilicate into the fluorine constituent of a fluoaluminate product and (2) obtaining a phosphate product substantially free of flouorine and aluminum.

Hitherto in treatments of phosphate rocks with strong acids converting the phosphorus into a solute contained in a resulting solution also containing phosphoric acid, the produced solutions have been disagreeably impure and unstable, subject to long-continuing decomposition and formation of sludge and also with a tendency, because of contained acid of fluorine, toward corrosive effects on containers and operating equipment. It is an object to at once produce from phosphate rocks, permanently clear solutions containing less impurities and unstable and degrading substances, and of reduced corrosive effect on containers etc.

Other objects appear from this specification.

In a mode of practice of the invention, at least a portion of the used phosphate rock is treated with and decomposed by application of a strong monovalent acid in presence of a compound of a common alkali metal and in presence of readily reactive silicious matter, using proportions of acid and of said compound in a manner to convert the greater part of the fluorine of the treated portion of the rock to solid fluosilicate of common alkali metal separated from the resulting produced *a* solution of calcium salt of the acid of treatment and of a compound of phopshorus. In this mode of practice of the invention it is preferred to select and use such proportions of acid and of the said compound so that about two-thirds of the fluorine of the treated portion of the rock is converted to solid undissolved fluosilicate of common alkali metal separated from so-produced *a* solution containing about one-third of the fluorine of the treated portion of the rock.

The separated solution may constitute a product, especially if most of the fluorine of the treated rock is converted to said solid fluosilicate and preferably the produced and separated *a* solution is further utilized in the practice as herein described and shown by examples.

In a mode of practice of the invention according to the above, the solid matter remaining after removal of the resulting solution of calcium salt of acid of treatment and of an acidic compound of phosphorus, is mostly composed of fluosilicate of common alkali metal. The said separated solid matter containing the fluosilicate is treated with and the fluosilicate decomposed by application of an alkaline solution of a common monovalent base. (Such bases consist of sodium, potassium and ammonium.) The fluosilicate is decomposed and there results *b* solution of fluoride of monovalent base, separated from the silica and other solids and united with *a* solution as herein shown.

Solutions *a* and *b* are united in proportion to result proportion to result in precipitation of aluminum and fluorine of *a* solution and of fluorine of *b* solution, with provision in the united solution of a sufficiency of a compound of common alkali metal. The resulting solid substantially solution-insoluble alkali metal fluoaluminate is separated as a product from the puried solution of calcium salt of acid of a treatment and of an acidic compound of phosphorus, as another product.

In another mode of operation of the invention also directed to recovery of fluorine of phosphate rock in a product of fluoaluminate of common alkali metal and to separate recovery of a product of phosphorus of the group which consists of phosphoric acid and of superphosphates, by treatment of phosphate rock with sulphuric acid, and with application of sufficient heat to the reacting mass of rock and acid to vaporize a high percentage of the fluorine of the rock separately condensed as fluosilicic acid in an intermediary product, it is preferred to select or prepare phosphate rock with a naturally or artificially low content of alumina and a naturally or artificially relatively high content of silica, in order to provide for the vaporization and condensation of fluosilicic acid and to restrain the proportion of unvaporized fluorine remaining in the resulting product.

As an example of means to restrain such proportion of reacting alumina and to provide a sufficiency of silica in so-treated phosphate rock to provide for vaporization of fluorine and yield of fluosilicic acid, prior to the treatment of the rock by the so-applied acid, the rock may be digested and alumina leached out by treatment of the rock with solution of an alkaline hydroxide, using for example 8% solution of sodium hydroxide, thereby extracting a considerable proportion of the alumina. Subsequently to the extraction of alumina, silica may be added to the rock if required to bring the percentage of reactible silica in the rock up to half or more of the percentage of fluorine in the rock.

In the next-above described mode of operation of the invention, so obtained fluosilicic acid is decomposed by treatment with a simple monovalent alkaline base, for example with solution of ammonia, thereby converting the fluorine of the fluosilicic acid to fluoride of the base in *b* solution subsequently utilized in production and recovery of a product of fluoaluminate of a common alkali metal, as elsewhere herein shown.

Monobasic acids usable in the invention comprise nitric, hydrochloric, and amidosulphonic (sulfamic) acids, and alkyl-sulphuric acids of molecular weight less than 146. Other monobasic acids such as perchloric, hydrobromic and trichloroacetic acids, and alkyl-sulphuric acids of molecular weight of more than 154 while technically usable are now practically excluded because of higher cost per mole and less utility of the resulting calcium salts. Polybasic acids usable in the invention are sulphuric and phosphoric acids.

The more conveniently and economically usable salts of common alkali metals usable in the invention comprise the chlorides, sulphates, nitrates, phosphates, carbonates and hydroxides of sodium and potassium. The more conveniently and economically usable alkaline substances applied in the conversion of fluosilicate to fluoride contained in *b* solution comprise the hydroxides, carbonates and monophosphates of ammonium, sodium and potassium.

It is not essential or required that united a and b solution contains a total of each of alkali metal, aluminum and fluorine such that all three are substantially completely intercombined and precipitated as alkali metal fluoaluminate. A deficiency of either or of any two can be made up by appropriate addition from another source or sources before or after uniting a and b solution.

It is not essential or required that a and b solution are produced in the proportion to utilize all of each. An excess of production of either above a proportion suitable for united use, may be disposed of as a separate product, or a deficiency of either may be made up from another source.

In the practice of the invention the fluosilicate whereof the fluorine is subsequently converted to fluoride of a common monovalent base is fluosilicate of the group consisting of fluosilicate of hydrogen (fluosilicic acid) and fluosilicate of sodium and potassium, and the intermediate product resulting from the described decomposition of a fluosilicate is fluoride of the group comprised by the fluorides of ammonium, sodium and potassium or mixtures of any of them.

Selected convenient and practicable modes of operation of practice of the invention are below described but the application of the invention is not limited thereto.

EXAMPLE 1

In this example a portion of phosphate rock is treated with and decomposed by application of solution of a strong monobasic acid in presence of reactive silica and a soluble compound of a common alkali metal. The said materials are provided and used in proportions and in a manner to effect the decomposition of the calcium phosphate and the conversion of the greater part of the fluorine of the treated rock to solid fluosilicate of alkali metal remaining as a solid separated from the resulting produced solution a–1 of calcium salt of acid of treatment and of an acidic compound of phosphorus and containing a minor proportion of the fluorine of the treated rock.

In a separate step, the so-produced alkali metal fluosilicate is treated with and decomposed by applied alkaline solution of a common monovalent base of the group of bases consisting of the hydroxides, carbonates and basic phosphates etc. of sodium, potassium and ammonium, thereby producing resultant solution of fluoride of monovalent base, and then separating the produced fluoride solution b from the resulting silica and other solids by filtration.

Another portion of phosphate rock (not necessarily of the same chemical analysis or from the same source) is treated with and decomposed by application of a strong acid and dissolvable compound of aluminum, using proportions of materials and proceeding in a manner to convert the calcium of the treated rock into dissolved calcium salt of acid of treatment, to convert the phosphorus of the rock to a dissolved acidic compound of phosphorus, and to convert most of the fluorine of the rock and the aluminum of said aluminum compound into solution-contained aluminum-fluorine compound, and separating the produced solution a–2 from the residual solids of the treated rock.

Solution a–1 may constitute a separate product.

Preferably solutions a–1 and a–2 are united as a solution. In either alternative there is provided in a–2 solution a proportion of soluble common alkali metal compound sufficient to supply the necessary proportional amount of alkali metal to result in obtaining the product of precipitated fluoaluminate of alkali metal as next-below described.

A portion of it but preferably all of solution b is united with solution a–2 whether or not the latter is in whole or in part united with solution a–1, thereby precipitating alkali metal, aluminum and fluorine of the united solution as solid alkali metal fluoaluminate separated as a product from thereby purified solution of calcium salt and a compound of phosphorus.

There is taken 100 parts of pulverized phosphate rock of analysis, CaO 48.6%, $P_2O_5$ 35.5% and fluorine 3.9%, mixed with 3.5 parts of finely pulverized highly silicious matter (for example, high-silica diatomite) and the mixture of rock and silica is treated with and decomposed by application of 40% nitric acid taken in the amount to provide 115 parts of $HNO_3$ and in which there has been dissolved 3.5 parts of sodium carbonate $Na_2CO_3$. The mixture is stirred until the reaction is adjudged to be complete. The resulting solution a–1 is separated from residual solids including the resulting sodium fluosilicate, by filtration and washing.

The separated solid material containing the formed sodium fluosilicate is leached with and decomposed by treatment with 9% solution of ammonia used in slight excess of requirement for decomposition of the sodium fluosilicate and the resulting solution of sodium and ammonium fluorides is separated with heating (to carry the sodium fluoride in solution) from the formed silica and other solids. The production of sodium and ammonium fluorides may be explained by

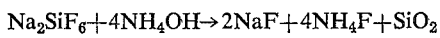

$$Na_2SiF_6 + 4NH_4OH \rightarrow 2NaF + 4NH_4F + SiO_2$$

The separated silica may constitute a product, or it may be used as source of silica to be mixed with phosphate rock prior to like repetitive use in mixture of phosphate rock according to the above description.

The produced solution of sodium and ammonium fluorides is designated as b solution.

Preferably, to solution a–1 there is added the amount of 35% nitric acid containing 48 parts of $HNO_3$ and the amount of aluminum trihydrate $Al(OH)_3$ which contain 3.8 parts of aluminum (element). The solution with the added aluminum compound is applied to the treatment and decomposition of a further portion of 42 parts of the same powdered phosphate rock, resulting in formation of resulting solution of calcium nitrate, aluminum-fluorine compound and phosphoric acid, containing most of the fluorine of said 42 parts of phosphate rock and a small amount of the fluorine of the first-taken 100 parts of the phosphate rock and designated as solution a–2.

To the latter said solution there is added and dissolved 3.5 parts of sodium carbonate $Na_2CO_3$ and solutions a–2 and b are united, thereby precipitating sodium fluorine and aluminum of the united solution as solid crude sodium fluoaluminate separated as a product from purified solution of calcium nitrate and phosphoric acid as a separate product.

In the example, if it is elected that so-produced solution a–1 be a separate product and not united with solution a–2, then the amount of the second portion of phosphate rock taken is reduced to 33 parts, the amount of aluminum trihydrate taken is reduced to the amount which contains 3.4 parts of aluminum (element) and the amount of nitric acid taken and used in the treatment of said second-taken portion of phosphate rock is reduced from 48 to 38 parts.

In this Example 1, other compounds of aluminum may be used instead of aluminum trihydrate. The use of aluminum sulphate is convenient and practical. In the treatment of the above second-taken portion of phosphate rock, using instead the amount of aluminum sulphate providing the same amount of aluminum (element), the amount of nitric acid taken and used in the treatment of said second-taken portion of phosphate rock is reduced from 48 to 38 parts of actual $HNO_3$.

Other strong monobasic acids may be used in replacement of nitric acid on an equimolar basis. For example, use may be made of hydrochloric, amidosulphonic (variously termed "sulfamic") and alkyl-sulphuric acids of molecular weight less than 146. Other strong monobasic acids, for example perchloric, hydrobromic and trichloracetic acids are technically usable but practially exluded from such use for reasons of cost, etc.

If, for example, amidosulphonic acid is used on an equimolar base instead of use of nitric acid etc. shown in the examples, resulting solution contains calcium amidosulphonate. When solution containing calcium amidosulphonate is maintained near boiling temperature the acid component hydrolyzes and decomposes precipitating calcium sulphate of quality usable in many applications, and forming dissolved ammonium sulphate. This is explained by $$Ca(NH_4SO_4)_2 \rightarrow CaSO_4 + (NH_4)_2SO_4$$

If the use of alkyl-sulphuric acid is substituted for use of nitric acid on an equimolar basis, for example using ethyl-sulphuric acid, the produced solution contains calcium ethyl-sulphate. On sustained heating of the produced solution, the acid component hydrolyzes and decomposes, ethyl alcohol forms and boils out as a recoverable product and sulphuric acid and calcium sulphate result.

$$Ca(C_2H_5SO_4)_2 \rightarrow 2C_2H_5OH + CaSO_4$$

In the use of hydrochloric acid substitutively for the use of nitric acid shown in the examples, the result differs in that resulting solutions contain calcium chloride instead of calcium nitrate.

EXAMPLE 2

In Example 2, in the treatment of the second-taken and smaller portion of phosphate rock, the use of nitric acid is substituted for by the use of sulphuric acid, replacing the use of 38 parts of $HNO_3$ by 30 parts of $H_2SO_4$ and resulting in $a$–2 solution of aluminum-fluorine compound and phosphoric acid.

In Example 2, the treatment of the first-taken portion of phosphate rock is the same as in Example 1, and the resulting $a$–1 solution preferably constitutes a separate product. In Example 2, the formation and recovery of $b$ solution of ammonium and sodium fluorides is the same as in Example 1.

In Example 2, preferably solutions $b$ and $a$–2 are united precipitating a solid product of sodium fluoaluminate separated as a product from purified solution of phosphoric acid as another product.

EXAMPLE 3

There is taken 100 parts of powdered phosphate rock of analysis CaO 49.1%, $P_2O_5$ 33.3% and fluorine 3.9% and mixed with 3.5 parts of finely powdered reactive silica and 5 parts of potassium chloride. The mixture is treated with and decomposed by application of solution of 40% nitric acid taken in the amount which contains 110 parts of $HNO_3$. The phosphate mineral is decomposed forming solid potassium fluosilicate containing most of the fluorine of the treated rock intermixed with resulting solution of calcium nitrate and chloride, and phosphoric acid, and also containing a minor proportion of the fluorine of the treated rock present in a solute. The produced solution is separated from the solids and designated as solution $a$–1.

In a separate step the separated solid matter containing the formed potassium fluosilicate is treated with and digested in solution containing 5.3 parts of sodium hydroxide NaOH, decomposing the fluosilicate and resulting in solution of sodium and potassium fluorides, separating the resulting solution $b$ with heating to keep sodium fluoride in solution.

In a separate operation 10 parts of aluminum trihydrate $Al(OH)_3$ is dissolved in the amount of heated 50% solution of sulphuric acid which contains 42 parts of $H_2SO_4$, resulting in solution of aluminum sulphate and sulphuric acid. To the latter said solution there is added 20 parts of water, another portion of 46 parts of the same phosphate rock and the mixture is digested until the reaction is adjudged to be complete, resulting in formation of solution of phosphoric acid, acid aluminum phosphate and aluminum-fluorine compound, and then the resulting solution $a$–2 is separated from the formed calcium sulphate, by filtration and washing.

Solutions $a$–1 and $a$–2 are united and there is added 1 part of sodium nitrate and the whole of solution $b$ thereby precipitating sodium, aluminum and fluorine of the united solution as sodium fluoaluminate separated as a solid product from solution of calcium nitrate, phosphoric acid and potassium chloride, as a product.

Referring to the accompanying drawing there is shown an example wherein two separate portions of fluoriferous phosphate rock are treated with and decomposed by an acid with use of a sufficient proportion of applied acid to convert the calcium of each of the used portions to calcium salt of acid of treatment. In the left-hand column of the drawing there is shown the treatment of a portion of fluoriferous phosphate rock with monovalent acid and a salt of a common alkali metal, in the presence of reactive silica with the result that a substantial part of the fluorine of the treated said rock is converted to solid fluosilicate of said metal and the calcium and phosphorus of the rock enter into the resulting solution of an acidic compound of phosphorus and calcium salt of monobasic acid. The solid fluosilicate is then decomposed by an alkaline substance whereby fluoride solution results and the fluorine of the treated fluosilicate then exists in solution.

In the right-hand column of the drawing there is shown the treatment of another portion of fluoriferous phosphate rock with solution of an acid but not necessarily a monovalent acid in the presence of a reactable compound of aluminum yielding resultant solution of an acidic compound of phosphorus and of aluminum fluorine compound. There is shown the uniting of the two aforesaid fluorine-containing solutions resulting in precipitation of a solid fluoaluminate containing the fluorine of both used portions of phosphate rock. The fluoaluminate is recovered as a product separated from solution of acidic compound of phosphorus as a product.

EXAMPLE 4

In this example phosphate rock is treated with and decomposed by applied solution of a strong monobasic acid in presence of chemically reactive silica and proportioned amounts of an alkali metal compound and compound of chemically reactive alumina, directed to the conversion of two-thirds of the fluorine of the rock to solid fluosilicate of the alkali metal and one-third contained in the resulting solution mainly in combination with aluminum. The produced solution $a$ containing calcium salt of acid of treatment, phosphoric acid and aluminum-fluorine compound is separated from the solids containing the fluosilicate of the alkali metal.

The separated solid matter containing said fluosilicate is treated with and the fluosilicate decomposed by alkaline solution of a common monovalent base converting the fluorine constituent into dissolved fluoride of monovalent base contained in resulting solution $b$ separated from the formed silica and other solids by filtration.

So-produced solutions $a$ and $b$ preprovided to contain a sufficiency of salt of a common alkali metal are united resulting in precipitation of alkali metal, aluminum and fluorine as solid crude alkali metal fluoaluminate separated as a product from purified solution containing calcium salt of acid of treatment and phosphoric acid, as a product.

There is taken 100 parts of powdered phosphate rock of analysis CaO 48.6%, $P_2O_5$ 35.5% and fluorine 3.9%. To provide chemically reactive silica and alumina in proportions directed toward converting two-thirds of the fluorine of the treated rock first to solid fluosilicate of common alkali metal and toward converting one-third of the fluorine of the rock to dissolved condition, there is taken 3.1 parts of clay of analysis $SiO_2$ 52.9% and $Al_2O_3$ 35.0%, mixed with 1.9 parts of bauxite of analysis $Al_2O_3$ 60%, mixed together and treated with and digested in strong solution of sodium hydroxide containing 2.8 parts of NaOH. The digested mixture is reduced to a solid by heating, the solid is pulverized and mixed with said 100 parts of phosphate rock and 3.3 parts of potassium chloride. To the mixture there is added the amount of 35% nitric acid which contains 115 parts of $HNO_3$. The mixture is digested without requirement for heating until the resulting chemical reaction is completed, and the produced solution *a* containing calcium and sodium nitrates and sodium chloride is separated from the solid matters containing the formed potassium fluosilicate, by filtration.

To the separated solids containing the potassium fluosilicates there is applied a sufficiency of solution of ammonium hydroxide to decompose the fluosilicate with the result of producing solution of the fluorides of ammonium and potassium contained in solution *b* separated from the solids by filtration. Sodium hydroxide solution or potassium hydroxide solution may be used as decomposant instead of solution of ammonia.

In solution *a* there is dissolved 1.6 parts of sodium carbonate $Na_2CO_3$. Solutions *a* and *b* are united resulting in precipitation of sodium, aluminum and fluorine of the united solution as solid sodium fluoaluminate separated as a product in the amount of 6.6 parts from thereby purified solution of calcium nitrate and an acidic compound of phosphorus and containing some calcium chloride, as a product.

EXAMPLE 5

This example is directed to utilization of phosphate rock in production of phosphoric acid of improved quality, and of a separate product of fluoaluminate containing most of the fluorine of the utilized rock.

In this example pulverized phosphate rock is treated with and decomposed by sulphuric acid with use of sulphuric acid of greater strength and with application of more heat than in the conventional practice of making phosphoric acid, in presence of chemically reactive silica and alumina used in proportions to effect the vaporization of the greater part of the fluorine of the treated rock separately condensed mainly as fluosilicic acid, and to effect the conversion of the lesser part of the fluorine of the treated rock to aluminum-fluorine compound contained in the produced liquid phosphoric acid. It is preferred to volatilize and condense a solution of fluosilicic acid containing two-thirds of the fluorine of the treated rock while one-third of the fluorine remains unevaporated and present in the produced phosphoric acid as aluminum-fluorine compound.

The condensed acid solution of fluosilicic acid is treated with and the fluosilicic acid decomposed by applied solution of a common alkali base converting the fluorine to dissolved fluoride of monovalent base in solution *b*.

The mass remaining from the treatment of the rock, consisting of solution of phosphoric acid and aluminum-fluorine compound and solid calcium sulphate, is treated in the usual way to recover the solution *a* of phosphoric acid and aluminum-fluorine compound.

Unless sodium hydroxide or sodium carbonate has been selected as the alkaline reagent of decomposition of the aforesaid fluosilicic acid, there is added to solution *a* sufficient sodium carbonate to provide the necessary sodium in the subsequent step of precipitation of sodium fluoaluminate as shown in the preceding examples and elsewhere herein.

Solutions *a* and *b* are united precipitating the sodium, aluminum and fluorine present as crude alkali metal fluoaluminate separated as a product from purified solution of phosphoric acid.

There is taken 3.1 parts of clay of analysis $SiO_2$ 52.9% and $Al_2O_3$ 35%. The clay is preferably, but not necessarily, pre-calcined at a temperature of about 1200 deg. F. to increase its acid reactibility. One-half part of aluminum tri-hydrate is mixed with the clay and 100 parts of pulverized phosphate rock of analysis CaO 48.6%, $Al_2O_3$ 35%, and fluorine 3.9% added, and mixed together with the clay and aluminum tri-hydrate.

To the mixture of phosphate rock etc. there is added the amount of 60% sulphuric acid which contains 88 parts of $H_2SO_4$. The whole is reacted with heating and steaming-out of fluosilicic acid according to common practice in making phosphoric acid except that more heating and steaming-out is practiced expelling two-thirds of the fluorine of the mix as acid vapors condensed to solution of fluosilicic acid, with unvaporized fluorine remaining dissolved in combination with aluminum.

The residual mass is treated in the usual way extracting recovered solution of phosphoric acid, but containing a substantial part of the started-with fluorine as dissolved aluminum-fluorine compound, as solution *a*.

The condensed solution of fluosilicic acid is decomposed with ammonia and the fluorine thereof converted to solution of ammonium fluoride which is separated from the silica and other solids as solution *b*.

5 parts of sodium carbonate are added to a solution *a* and then solutions *a* and *b* are united precipitating solid sodium fluoaluminate separted as a product in the amount of 6.5 parts from solution of phosphoric acid relieved of its content of aluminum and fluorine, as a product.

EXAMPLE 6

In this example two separate portions of phosphate rock are separately treated with and decomposed by strong acid converting the phosphorus into two separate phosphate products while most of the fluorine of the separately treated portions of the rock is recovered in a single product of fluoaluminate of a common alkali metal.

One portion of phosphate rock is converted in a solid-to-solid conversion to a superphosphate by treatment with sulphuric acid according to common practices in production of superphosphates with the difference that a greater than usual proportion of the fluorine of the rock is steamed out of the hot reacting mass of rock and acid and condensed as solution of fluosilicic acid.

The recovered solution of fluosilicic acid is treated with and decomposed by alkaline solution of a common monovalent base and there is obtained solution *b* of fluoride of the base as herein elsewhere shown.

Another portion of phosphate rock is separately treated with and decomposed by applied solution of a strong acid used in proportion to convert the phosphorus constituent of the rock to phosphoric acid. In the said treatment there is provided an amount of a chemically reactive compound of aluminum sufficient to convert the fluorine of the treated rock to aluminum-fluorine compound becoming a dissolved constituent of the produced solution of phosphoric acid, etc. as solution *a*. In the treatment no acid of fluorine results.

Portions of solutions *a* and *b* to be united are taken so that the amount of solution *b* provides about twice as much fluorine to the united solution as is provided by the taken portion of solution *a*, a sufficiency of sodium compound is provided and used in the mixture, and solutions *a* and *b* are united precipitating sodium fluoaluminate in a solid product separated from purified solution containing phosphoric acid, as a product.

There is taken 100 parts of phosphate rock of analysis CaO 49.1%, $P_2O_5$ 33.1% and fluorine 3.8%. The powdered rock is treated with and decomposed by strong sulphuric acid according to common practices in production of "normal" superphosphate except that there is premixed in the treated phosphate rock 3 parts of highly silicious matter (for example diatomite) and superheated steam is flowed through the reacting mass of rock and acid, steaming out and condensing an increased amount of fluosilicic acid solution.

The fluosilicic acid is treated with and decomposed by ammonia so obtaining solution of ammonium fluoride containing 4.5 parts of $NH_4F$.

The superphosphate constitutes a separate product.

2.8 parts of powdered bauxite of analysis $Al_2O_3$ 60% is treated with and decomposed by 55% sulphuric acid solution taken in the amount which provides 28 parts $H_2SO_4$. On completion of decomposition of the bauxite there is added to the resulting solution 10 parts of water and 31 parts of the same powdered phosphate rock. Upon completion of decomposition of the rock the produced solution of phosphoric acid and aluminum-fluorine compound is separated from the gypsum and other solids by filtration and washing. No acids of fluorine result or are contained in the produced solution $a$.

To the latter said solution there is added and dissolved 1.6 parts of sodium carbonate and the resulting solution $a$ is united with solution $b$ as above produced. There is precipitated 8 parts of sodium fluoaluminate separated as a solid product from resulting solution of phosphoric acid and ammonium phosphate deprived of aluminum and fluorine, as a product.

EXAMPLE 6

The improvements hereof enable the practical and beneficial use of grades of phosphate rock heretofore unacceptable for use in treatments of phosphate rocks with acids.

In this example use is made of phosphate rock containing a proportionally large amount of clay mineral and therefore of low grade, prior to treatment the rock is preferably calcined at a moderate temperature, for example at about 1200 deg. F. destroying the containing fossil gluey constituent and rendering the alumina of the clay acid-reactable.

The phosphate rock, preferably calcined before use, is treated with and decomposed by application of a solution containing a sufficiency of monobasic strong acid of the above-stated group of acids to convert the phosphorus and calcium of the treated rock respectively to phosphoric acid and calcium salt of the acid of treatment contained as solutes in resulting solution $a$, said solution also containing most of the fluorine of the treated rock in combination with aluminum dissolved from the clay constituent of the treated rock.

A separate portion of high-grade phosphate rock or clean apatite concentrate is treated with solution of the same acid as used in treatment of the former portion of phosphate rock of this example, in presence of potassium chloride, using proportions of substances to result in solution $a$–2 of calcium salt of acid of treatment, calcium chloride and phosphoric acid. Solution $a$–2 constitutes a separate product. The fluorine of the second-taken portion of phosphate rock is converted to solid potassium fluosilicate separated from solution $a$–2.

The separated potassium fluosilicate is decomposed with solution of potassium hydroxide so obtaining solution $b$ of potassium fluoride.

Sodium carbonate is added to and dissolved in solution $a$ and solutions $a$ and $b$ are united precipitating the aluminum and fluorine of the united solution as solid sodium fluoaluminate separated as a product from purified solution of calcium and potassium salts of acid of treatment and of phosphoric acid as a product.

There is taken 100 parts of pre-calcined phosphate rock of analysis CaO 42.0%, $P_2O_5$ 27.7%, fluorine 2.9% and $Al_2O_3$ 4.6%. The powdered rock is treated with and decomposed by 35% solution of nitric acid taken in the amount which contains 101 parts of $HNO_3$. The mixture is heated and digested until chemical reactions are adjudged to be completed. Then the resulting solution of calcium nitrate, phosphoric acid and aluminum-fluorine compound $a$ is separated from solids by filtration and washing out.

There is taken a second portion of high-analysis phosphate rock of analysis CaO 49.5%, $P_2O_5$ 36.1% and fluorine 4.0% in the amount of 145 parts, to which is added 7.8 parts of potassium chloride. The mixture of rock and potassium chloride is treated with and decomposed by applied solution of 40% strength nitric acid taken in the amount which contains 170 parts of $HNO_3$. The mixture of rock and acid solution is digested without artificial heating until the chemical reactions are adjudged to be complete. The produced solution $a$–2 of calcium nitrate and chloride and phosphoric acid constitutes a separate product.

The separated potassium fluosilicate is decomposed with 20% solution of potassium hydroxide used in the proportion to convert the potassium fluosilicate to potassium fluoride contained in solution $b$ of potassium fluoride separated by filtration from the formed silica and other solids.

To solution $a$ there is added and dissolved 11 parts of sodium carbonate and solutions $a$ and $b$ are united resulting in precipitation of sodium fluoaluminate recovered by filtration in the amount of 15 parts separated as a product from solution of purified calcium nitrate and phosphoric acid as a product.

In the selection of grades of phosphate rock etc. utilized as hereinbefore disclosed, treating a portion of phosphate rock with solution of a strong monobasic acid in presence of a compound of a common alkali metal, producing solution of calcium salt of acid of treatment and of a compound of phosphorus separated from produced solid fluosilicate of said metal, the latter then decomposed by treatment with an alkaline solution of a common monovalent base so obtaining solution $b$ of fluoride of common monovalent base, the use of phosphate rock of better quality presents more advantages than in the other hereindescribed treatment of another portion of phosphate rock with solution of a strong acid and an aluminum compound, producing $a$ solution.

If there is made a selection of phosphate rocks by grades to be separately used as herein shown, the benefit of use of higher grade phosphate rock utilized in the herein-described manner resulting in production of a $b$ solution, is greater than the benefit of use of higher grade phosphate rock used in the described manner resulting in production of an $a$ solution containing a dissolved acidic compound of phosphorus and an aluminum-fluorine compound, with the consequence that an additional economic advantage is obtained by separation of phosphate rock by grades separately utilized as described.

Since the proportional availability of lower grades of phosphate rock may be substantially greater and the cost usually less, it is an object to achieve economical use of a proportion of phosphate rock of lower grade and of higher content of alumina enabled by the means described in this example.

EXAMPLE 7

Means of accomplishing such beneficial reapportionment toward utilization of a greater proportion of phosphate rock of lower grade consists in pretreating phosphate rock of relatively lower content of phosphorus and high content of clay mineral, and therefore of alumina by a pretreatment which consists in treating and digesting phosphate rock of high content of clay mineral in heated solution of sodium hydroxide. Use of solution of sodium hydroxide of a strength of 8% of NaOH is preferred. The produced solution containing sodium aluminate is separated from the partially decomposed phosphate rock by filtration. There is taken 100 parts of pulverized phosphate rock of good quality and of analysis CaO 48.6%, $P_2O_5$ 35.5% and fluorine 3.9 parts, mixed with 7.3 parts of potassium nitrate. The mixture is treated with and decomposed by application of 40% nitric acid taken in the amount containing 109 parts of $HNO_3$. The mixture is digested with stirring, preferably without application of heating, until reaction is adjudged to be complete. The produced solution of calcium nitrate and phosphoric acid is separated from the formed potassium fluosilicate by filtration and the solution constitutes a separate product.

The separated solid matter largely of potassium fluosilicate is treated with and decomposed by applied solution of sodium carbonate taken in the amount which contains 7.5 parts of $Na_2CO_3$. The solution is heated and used in sufficient volume to maintain the formed sodium fluoride in solution and the heated solution is separated from the silica and other solids. On cooling the separated solution sodium fluoride separates out but is not separated, the whole constitutes solution $b$.

Low grade phosphate rock containing about 30% of clay mineral is treated with and partly decomposed as aforesaid by digestion with heated solution of sodium hydroxide, and the solution then removed by filtration from the partly decomposed phosphate rock of analysis $P_2O_5$ 25.3%, $Al_2O_3$ 2.9% and fluorine 2.2% on dry-weight basis.

There is taken 90 parts of the so-treated phosphate rock, dry-weight basis and treated with and decomposed by applied solution of 40% nitric acid taken in the amount which contains 83 parts of $HNO_3$. The produced solution of calcium nitrate, phosphoric acid and aluminum-fluorine compound $a$ is separated from residual solids by filtration and washing. To the separated solution there is added 0.5 part of sodium carbonate and then solution $a$ and the whole of solution $b$ including the solid separated sodium fluoride are united resulting in precipitation of sodium aluminum and fluorine of the united solution as crude sodium fluoaluminate separated as a product from solution of purified calcium and potassium nitrates and phosphoric acid as a product.

EXAMPLE 8

In this example, 3 separate portions of phosphate rock are separately treated with strong acid. The products are (1) neutral superphosphate consisting mainly of dicalcium phosphate and calcium sulphate, and (2) fluoaluminate product. If a single source of phosphate rock is used, it is preferred to first separate the powdered rock into a higher-grade fraction and a lower grade fraction. For example, powdered phosphate rock is separated by the well-known airblast and settlement process into a higher-grade but coarser particled fraction and a lower grade more finely particled fraction with a higher content of aluminum silicate mineral.

A first portion of phosphate rock preferably of the higher grade and minimum practicable content of alumina, mixed if required with a few percent of a powdered highly silicious substance, is treated with strong solution of sulphuric acid in amount proportioned to convert the calcium of the rock to monocalcium phosphate and calcium sulphate as commonly done in the well-known practice of converting powdered phosphate rock to the "regular" or "normal" superphosphate, but with application of sufficient artificial heating and steaming-out, to vaporize the greater part of the fluorine of the rock as vaporized fluorine acid condensed separately to solution of fluosilicic acid.

The obtained solution of fluosilicic acid is converted to solution $b$ of fluoride of common monovalent base as eleswhere shown herein. For example the fluosilicic acid is decomposed by ammonia, producing solution $b$ of ammonium fluoride. The resulting mass mainly of calcium sulphate and monocalcium phosphate is utilized as below shown in this example.

A second portion of phosphate rock permissibly of low grade and of high content of alumina is treated with and decomposed by solution of a strong acid producing solution $a$ of phosphoric acid and aluminum-fluorine compound. If a strong monovalent acid is used, the produced solution $a$ also contains calcium salt of acid of treatment. The produced solution $a$ is separated and united with the said solution $b$, in presence of a sufficient amount of provided compound of a common alkali metal, precipitating a product of alkali metal fluoaluminate, separated from purified solution containing phosphoric acid, as a product.

A third portion of phosphate rock containing a necessary proportion of a reactable compound of aluminum is mixed with the aforesaid intermediate mass of monocalcium phosphate and calcium sulphate and the resulting mix is digested wet, preferably at an elevated temperature but below boiling temperature until the reaction of phosphorus-containing components of the resulting mix is substantially completed with conversion of the calcium and phosphorus constituents to dicalcium phosphate, contained in a product of neutral superphosphate.

There is taken as the first portion of phosphate rock 100 parts of the powdered rock of analysis CaO 48.0%, $P_2O_5$ 35.3%, $Al_2O_3$ 0.5% and fluorine 3.9% and treated with somewhat diluted sulphuric acid in the amount which contains 62 parts of $H_2SO_4$. By application of sufficient heating and steaming-out, 80% of the fluorine of the rock is vaporized and condensed in obtained solution of fluosilicic acid. The fluosilicic acid is treated with and decomposed by ammonia, producing solution $b$ of ammonium monofluoride separated from the formed silica. The residual damp mass from the treatment of the rock consists mainly of monocalcium phosphate and calcium sulphate.

A second portion of phosphate rock of high content of aluminum silicate minerals of analysis CaO 38.0%, $P_2O_5$ 24.9%, fluorine 2.9% and $Al_2O_3$ 5.2% is taken in the amount of 62 parts and treated with and decomposed by 35% solution of nitric acid taken in the amount which contains 55 parts of $HNO_3$, resulting in production of separated solution $a$ of calcium nitrate, phosphoric acid and aluminum-fluorine compound.

Solutions $a$ and $b$ are united with addition of 7 parts of sodium carbonate $Na_2CO_3$, resulting after digestion and re-solution of first-formed calcium fluoride of precipitated sodium-calcium fluoaluminate separated as a product from a product consisting of purified solution of phosphoric acid, ammonium phosphate and calcium nitrate.

A third portion of finely pulverized phosphate rock of the same analysis as that of the first portion taken in this example, is taken in the amount of 69 parts and mixed with the wet residual mass mainly of calcium monophosphate and calcium sulphate resultant for the described treatment of the first portion of this example, to which is added and intermixed 6.3 parts of finely ground bauxite containing 60% $Al_2O_3$. The wet mix is digested preferably at an elevated temperature but at less than boiling temperature until the reaction between the phosphate rock and the monocalcium phosphate is substantially completed resulting in a product consisting of a mass mainly composed of hydrated dicalcium phosphate and calcium sulphate containing the phosphorus of the first and third taken portions of phosphate rock but less than half the fluorine of said portions.

EXAMPLE 9

Phosphate rock can be converted to superphosphate with phosphoric acid, instead of by use of sulphuric acid. In this example, in the treatment of the first taken portion of phosphate rock, phosphoric acid is used, instead of using sulphuric acid as in Example 8.

100 parts of finely powdered phosphate rock of the same analysis as that of the first taken portion of the rock in Example 8, is treated with and decomposed with the amount of strong phosphoric acid which contains 86 parts of $P_2O_5$, applying heat and vaporizing and condensing fluosilicic acid, which is then converted to solution of fluoride of common monovalent base and utilized as in Example 8. The treatment of the second taken portion of phosphate rock is the same in this example as in Example 8.

To the damp mass resulting from the conversion of the first taken portion of phosphate rock by phosphoric acid, mainly of monocalcium phosphate but not containing calcium sulphate, there is added, mixed, digested and reacted as in the case of the third taken portion of Example 8. 5 parts of finely powdered bauxite of analysis 60% $Al_2O_3$ and 38 parts of the same phosphate rock as used in the first taken portion of rock, obtaining as product neutral superphosphate consisting mainly of dicalcium phosphate undiluted with calcium sulphate, as in Example 8.

In the claims, by phosphate rocks, is meant the numerous varieties of the amorphous phosphate rocks, and the crystallized form of apatite.

In the examples there is shown the obtainment from phosphate rock and the like, of solution of fluoride of common monovalent base, for example, of proportional composition of $2NH_4F+NaF$, designated as a solution $b$.

There is also shown the obtainment from phosphate rock and the like, of solution containing aluminum and fluorine, supposedly present as subfluoride of aluminum of composition such as $AlF_2OH$, $AlF_2NO_3$, $AlF_2Cl$ and $AlF_2H_2PO_4$, designated as an $a$ solution.

When $a$ and $b$ solutions are united, with provision of an adequate amount of common monovalent base, preferably provided as a sodium salt, there results either immediate precipitation of aluminum, fluorine and base in precipitated fluoaluminate of the base, or a first-formed precipitated calcium fluoride then disappears replaced by the precipitated fluoaluminate, the end result being substantially the same. For example, as shown by

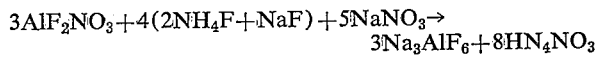

The proportions in which $a$ and $b$ solutions are united and adjustments in amounts of aluminum, fluoride and compound of monovalent base present or provided from other sources may be so effected to result in substantial complete precipitation of aluminum and fluorine in fluoaluminate product, separated from solution of a phosphorus compound relieved of aluminum and fluorine as impurities.

In the claims: by reactable compound of aluminum is meant to include compounds of aluminum decomposable and reactable under the conditions existing wherein pulverized phosphate rock and the like is treated with acid solution capable of decomposing the fluophosphate constituent of the rock.

By alkaline compound of common monovalent base it is meant to include the hydroxides, carbonates and monophosphates of sodium, potassium and ammonium.

By the term common monovalent base it is meant to include the bases of sodium, potassium and ammonium.

By the term common strong strong acid it is meant to include nitric, hydrochloric and sulphuric acids.

By fluoaluminate is meant a compound analogous to an aluminate wherein one or more atoms of oxygen are each replaced by two atoms of fluorine. For example Sodium aluminate: $Na_3AlO_3$
Sodium fluoaluminate: $Na_3AlF_6$ By the term simple strong acid of an element of atomic weight between 30 and 33 and of molecular weight approximately 98, there is included sulphuric and phosphoric acids only.

By the term common strong monovalent acid there is included nitric and hydrochloric acids only.

By the term common alkali metals it is meant to include sodium and potassium only.

By the term reactable silica is meant to include forms of highly silicious matter chemically reactable under the conditions wherein phosphate rock and the like is treated with and decomposed by solution of an acid capable of decomposing the fluophosphate constituent of the rock.

By the term superphosphate is meant an impure mass largely of hydrated calcium phosphate of the characteristics of masses resulting from direct conversion of powdered phosphate rock from thereto-applied strong acid of the group consisting of sulphuric and phosphoric acids.

I claim:

1. In the chemical treatment of fluoriferous phosphate rock to obtain a product consisting of solution of an acidic compound of phosphorus and to obtain a separate solid fluoaluminate product, the process which in part comprises treating and decomposing a portion of said rock by a thereto-applied proportion of solution of acid selected from the group consisting of alkyl-sulphuric acids of molecular weight less than 146 and of nitric, hydrochloric, amidosulphonic and sulphuric acids substantially sufficient to convert the phosphorus and calcium of said portion respectively to an acidic compound of phosphorus and to calcium salt of acid of treatment of said portion and providing in the said treatment of said portion an amount of reactable fluorine-acceptive compound of aluminum whereof the amount of aluminum is substantially sufficient to convert the fluorine of said portion to aluminum-fluorine compound dissolved in the resulting solution designated as $a$ solution; the said process in other part comprises treating a portion of fluoriferous phosphate rock with solution of acid selected from the group consisting of alkyl-sulphuric acids of molecular weight less than 146 and of nitric, hydrochloric and amidosulphonic acids in the presence of reactable silica and salt of a common alkali metal used in proportions sufficient to convert the greater part of the fluorine of the latter said portion to solid fluosilicate of said metal immersed in the resulting solution of calcium salt of acid of treatment and of acidic compound of phosphorus, separating said solid fluosilicate from said immersing solution, decomposing said fluosilicate with thereto-applied solution of a substance selected from the group consisting of the hydroxides, carbonates and monophosphates of ammonium, sodium and potassium thereby forming solid silica and a fluoride solution designated as $b$ solution separated from silica and then uniting and mixing said $a$ and $b$ solutions in proportion to effect the precipitation of aluminum and fluorine of the united solution and separating and recovering the precipitate as a fluoaluminate product separated from solution of an acidic compound of phosphorus recovered as a product.

2. The process according to claim 1 wherein the selected acid used in treating and decomposing the first-stated portion of said rock is sulphuric acid and the selected acid used in treating and decomposing the second-stated portion of said rock is nitric acid and the obtained solution product is solution of calcium nitrate and of acidic compound of phosphorus.

3. The process according to claim 2 wherein the obtained solution product is solution of calcium nitrate and phosphoric acid.

4. The process according to claim 1 wherein the selected acid used in treating and decomposing each of said portions of said rock is solution of nitric acid and the obtained solution product is solution of calcium nitrate and of acidic compound of phosphorus.

5. In the chemical treatment of fluoriferous phosphate rock to obtain a product consisting of solution of calcium salt of a monobasic acid and of acidic compound of phosphorus and a separate solid fluoaluminate product, the process which comprises treating and decomposing a portion of said rock by a thereto-applied proportion of solution of acid selected from the group consisting of alkyl-sulphuric acids of molecular weight less than 146 and of nitric, hydrochloric and amidosulphonic acids substantially sufficient to convert the phosphorus of said treated portion to acidic compound of phosphorus dissolved in the resulting solution and providing in the said treating an amount of reactable fluorine-acceptive aluminum compound whereof the aluminum is present in said treating in proportional amount sufficient to convert a substantial part but less than one-half of the fluorine of said portion to aluminum-fluorine compound dissolved in said resulting solution and also providing in the said treatment of said portion amounts of reactable silica and salt of common alkali metal sufficient to convert more than one-half of the fluorine of said treated portion to solid fluosilicate of said metal, separating said fluosilicate from said resulting solution of calcium salt of acid of treatment, of acidic compound of phosphorus and of aluminum-fluorine compund designated as *a* solution, decomposing said separated fluosilicate with thereto-applied alkaline solution of substance selected from the group consisting of the hydroxides, carbonates and monophosphates of ammonium, sodium and potassium thereby forming solid silica and a fluoride solution, separating said fluoride solution designated as *b* solution from silica, uniting and mixing said *a* and *b* solutions in the presence therein of a salt of a base consisting of ammonium, sodium and potassium using proportions to effect precipitation of aluminum and fluorine of the united and mixed solution combined in a fluoaluminate precipitate recovered as a fluoaluminate product separated from solution of calcium salt and of acidic compound of phosphorus recovered as a product.

6. The process according to claim 5 wherein nitric acid is selected for use in the said treating and decomposing of said portion of said rock and the solution product is solution of calcium nitrate and of acidic compound of phosphorus.

7. The process according to claim 5 wherein nitric acid is selected for use in the said treating and decomposing of said portion of said rock and the solution product is solution of calcium nitrate and of phosphoric acid.

8. In the chemical treatment of fluoriferous phosphate rock directed to the production of (1) a superphosphate product, (2) solution of acidic compound of phosphorus, (3) a solid fluoaluminate product, the process which in part comprises treating a portion of said rock with a proportion of heated aqueous sulphuric acid effective to convert the mixture to (1) a hydrous mass of calcium sulphate and hydrated calcium phosphate and recovering the said mass as a superphosphate product, and to (2) vaporized hydrous acid of fluorine condensed to a fluosilicic acid condensate, decomposing said condensate with thereby-applied alkaline substance selected from the hydroxides, carbonates and monophosphates of the bases consisting of ammonium, sodium and potassium thereby forming solid silica and a fluoride solution designated as *b* solution; the said process in other part comprises treating a portion of fluoriferous phosphate rock with solution of acid selected from the group consisting of nitric and sulphuric acids used in proportion substantially sufficient to convert the calcium of said second-taken portion to calcium salt of acid of treatment in the presence in said treating of an amount of retractable fluorine-acceptive aluminum compound substantially sufficient to convert the fluorine of said second-taken portion to aluminum-fluorine compound dissolved in the resulting solution designated as solution *a*, then uniting said *a* and *b* solutions in the presence therein of a salt of a base of the group consisting of ammonium, sodium and potassium in proportions of use of said *a* and *b* solution and of said salt to effect the precipitation of the aluminum and fluorine of the united and mixed solutions combined in a solid fluoaluminate recovered as a product separated from solution of acidic compound of phosphorus recovered as a product.

9. The process according to claim 8 wherein the selected acid used in the treating and decomposing of the said second-taken portion of fluoriferous phosphate rock is sulphuric acid and the solution product is solution of acidic compound of phosphorus.

10. The process according to claim 8 wherein the selected acid used in the treating and decomposing of the said second-taken portion of said rock is mixed nitric and sulphuric acids and the solution product is solution of calcium nitrate and of acidic compound of phosphorus.

11. In the chemical treatment and utilization of fluoriferous phosphate rock directed to making from said rock a solid fluoaluminate product and a separate product consisting of solution of calcium nitrate and of acidic compound of phosphorus, the process which comprises treating and decomposing a portion of said rock with a proportion of thereto-applied solution of nitric acid substantially sufficient to effect conversion of the phosphorus of said portion of said rock to dissolved acidic compound of phosphorus contained in the resulting solution also containing calcium nitrate, conducting the said treating and decomposing in the presence of (1) reactable silica, (2) salt of a common alkali metal and of (3) an amount of reactable fluorine-acceptive aluminum compound whereof its content of alumina ($Al_2O_3$) does not exceed the amount of fluorine contained in the said used portion of said rock thereby producing solid fluosilicate of said metal immersed in resulting solution of calcium nitrate, of acidic compound of phosporus and of aluminum-fluoride compound, separating said solid fluosilicate from said immersing solution designated as *a* solution decomposing said separated fluosilicate with thereto-applied alkaline substance selected from the group consisting of the hydroxides, carbonates and monophosphates of ammonium, sodium and potassium thereby forming solid silica and a fluoride solution, separating said fluoride solution designated as *b* solution from the said silica, mixing and uniting *a* and *b* solution in the presence of a salt of a common alkali metal and in proportion to effect precipitation of fluorine of so-used *b* solution and fluorine and aluminum of so-used *a* solution in precipitated solid fluoaluminate recovered as a product separated from the accompanying solution of calcium nitrate and of an acidic compound of phosphorus recovered as a product.

12. In the utilization and chemical processing of fluoriferous and aluminous mineral directed to making therefrom a solid fluoaluminate product and a product consisting of solution of calcium nitrate and of an acidic compound of phosphorus, the process whereof sequential steps comprise (1) removing part of the alumina of said mineral by leaching with solution of hydroxide of a common alkali metal and separately recovering the solid residue of the mineral, (2) treating the said residue with thereto-applied acid solution, including the use of nitric acid, in proportion of acid sufficient to substantially complete the conversion of the phosphorus of said residue to an acidic compound of phosphorus dissolved in the resulting solution and to convert a substantial part of the calcium of the said residue to calcium nitrate dissolved in the said resulting solution, the said treating carried out in the presence of silica and of salt of a common alkali metal in proportions sufficient to convert the greater part but not all of the fluorine of said residue to solid fluosilicate of said metal immersed in the said resulting solution, (3) separating said solid fluosilicate from said resulting solution designated as *a* solution, (4) decomposing said fluosilicate with alkaline solution of a compound of a base of the group consisting of sodium, ammonium and potassium producing solid silica and a fluoride solution, separating the silica from the fluoride solution designated as *b* solution and (6) uniting and mixing portions of *a* and *b* solutions in the presence in the mixture of salt of a common alkali metal in the mixture in proportions to effect precipitation of aluminum and fluorine of said united solutions as constituents of a resulting solid fluoaluminate separated as a product from solution of an acidic compound of phosphorus and of calcium nitrate recovered as a product.

13. The process according to claim 12 wherein in step (2) the said used salt is a salt of potassium.

14. The process according to claim 12 wherein in step (2) the acid used is mainly nitric acid and the solution product is solution of calcium nitrate and of phosphoric acid.

(References on following page)

References Cited

UNITED STATES PATENTS

| | | |
|---|---|---|
| 2,783,140 | 2/1957 | Hignett et al. |
| 3,005,685 | 10/1961 | Riedl et al. _____ 23—88 |
| 3,058,803 | 10/1962 | Hinkle et al. _____ 23—88 |
| 2,853,363 | 9/1958 | Sidun et al. _____ 23—88 |
| 2,816,818 | 12/1957 | Gross _____ 23—88 |
| 2,728,634 | 12/1955 | Miller _____ 23—88 |
| 2,945,745 | 7/1960 | Reeve _____ 23—88 |
| 3,024,086 | 3/1962 | Cines _____ 23—88 |
| 2,981,598 | 4/1961 | Tarbutton et al. ____ 23—88 |
| 2,994,582 | 8/1961 | Byrns _____ 23—88 |
| 3,000,702 | 9/1961 | Cunningham _____ 23—88 |
| 2,783,128 | 2/1957 | Wendt _____ 23—88 |
| 3,106,448 | 10/1963 | Whicher et al. _____ 23—88 |
| 2,683,075 | 7/1954 | Caldwell _____ 23—88 XR |
| 2,883,266 | 4/1959 | Hodges et al. _____ 23—88 |
| 2,954,275 | 9/1960 | Carothers et al. ____ 23—88 |
| 2,976,141 | 3/1961 | Carothers et al. ____ 71—40 |
| 2,981,601 | 4/1961 | Kidde _____ 23—88 XR |
| 2,996,355 | 8/1961 | Kemlet _____ 23—88 |
| 3,002,812 | 10/1961 | Williams _____ 23—88 XR |
| 3,021,193 | 2/1962 | Cunningham _____ 23—88 |
| 3,055,733 | 9/1962 | Lang et al. _____ 23—88 |
| 3,092,487 | 6/1963 | Nero-Hacohen ____ 23—88 XR |
| 3,107,145 | 10/1963 | Hinkle et al. _____ 23—108 |

OTHER REFERENCES

"Fluorine Chemistry," by Dr. J. H. Simons, vol. 1, 1950 ed., pp. 39 and 40, Academic Press Inc., New York.

EDWARD STERN, Primary Examiner

U.S. Cl. X.R.

23—102, 103, 106, 108, 119, 122, 143, 165, 182; 71—39, 40